UNITED STATES PATENT OFFICE.

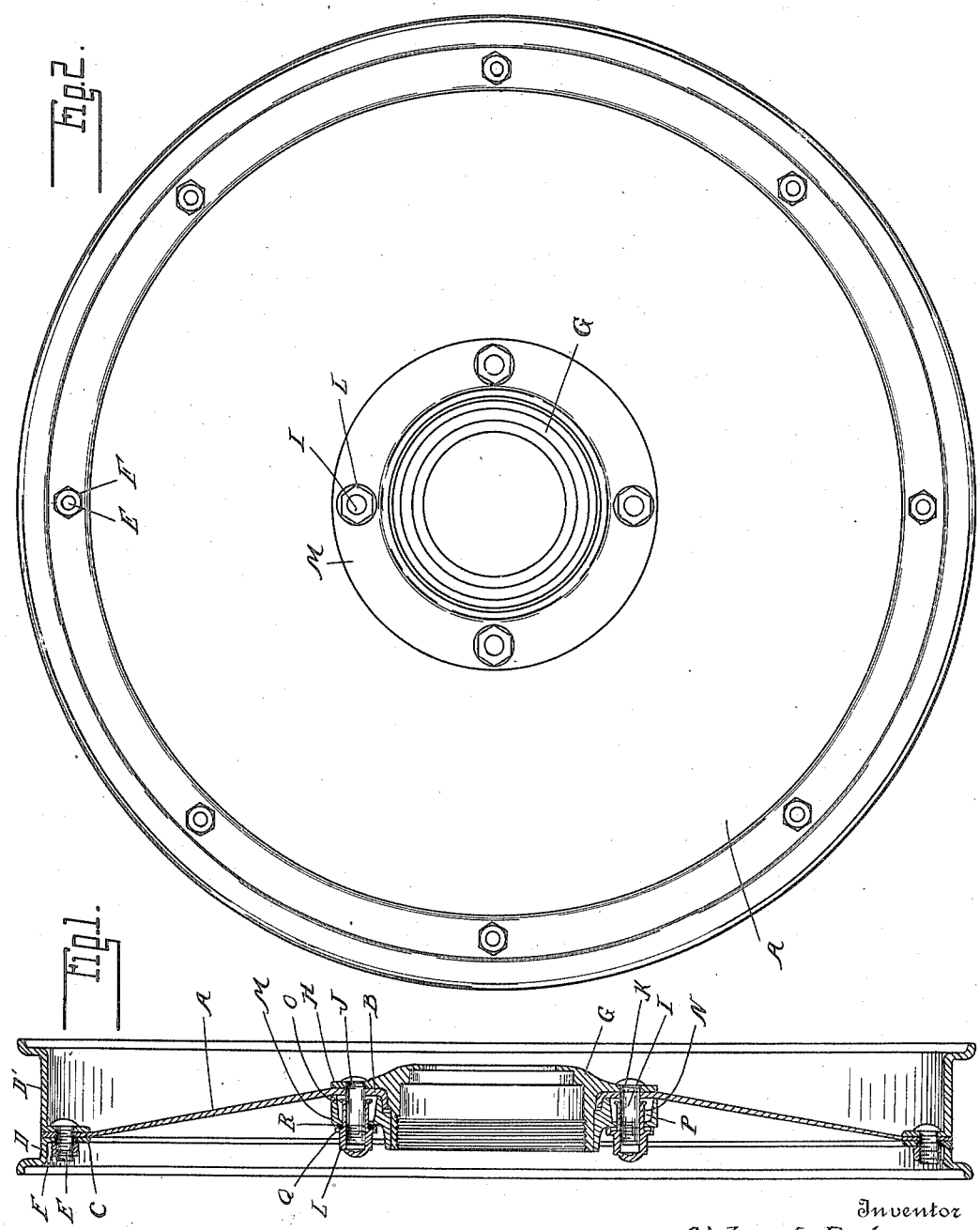

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

DEMOUNTABLE VEHICLE-WHEEL.

1,249,827. Specification of Letters Patent. Patented Dec. 11, 1917.

Application filed November 6, 1916. Serial No. 129,730.

*To all whom it may concern:*

Be it known that I, ALDEN L. PUTNAM, a citizen of the United States of America, residing at Detroit, in the county of Wayne and State of Michigan, have invented certain new and useful Improvements in Demountable Vehicle-Wheels, of which the following is a specification, reference being had therein to the accompanying drawings.

The invention relates to automobile vehicle wheels of that type in which the body of the wheel is formed of a dished disk demountably secured to the hub. The present invention has particular reference to the means employed for securing the wheel to the hub and comprises the novel construction as hereinafter set forth.

In the drawings:

Figure 1 is a section through the wheel;

Fig. 2 is an elevation thereof.

A is the dished disk body, which is preferably formed of sheet metal tapering in gage, being of greatest thickness at the center and thinnest at the periphery. B is the inner or hub-engaging portion of this disk, which is arranged in the plane of the wheel, and C is the outer peripheral portion arranged in a parallel plane and secured to the rim preferably by a demountable attachment, comprising complementary rim sections D and D' having inwardly-extending flanges embracing the portion C and secured thereto by bolts E and clamping nuts F.

G is the hub of the wheel, which may be of standard construction, provided with an outwardly-extending flange H lying adjacent to the portion B of the disk. I are clamping bolts which engage the flange H and project laterally therefrom. Preferably these bolts have a threaded portion J for engaging a corresponding threaded aperture in the flange, and locking screws K engaging the head of the bolt serve to hold the same from rotation or disengagement from the flange H. The projecting portion of the bolt is also threaded for engagement with a nut L by which an annular head M sleeved upon the hub may be clamped against the portion B.

It is desirable to avoid the use of detachable nuts and bolts which are frequently lost when the wheel is demounted. This I have accomplished by making the nut L with an inwardly-projecting sleeve N fitting over the shank of the bolt and having clearance to pass over the threaded portion thereof. This sleeve slidably engages an aperture in the head M and is provided at its inner end with a flange or head O for limiting its movement and preventing disengagement. The head M is recessed at P to provide clearance for the sleeve N and flange O, the arrangement being such that the threaded portion of the nut may be completely disengaged from the threaded portion of the bolt, while the head M remains stationary and the sleeve N is adjusted longitudinally with respect thereto. In the same manner when the head M is engaged with the hub it may be moved into position for bearing against the portion B of the disk before the nuts L are engaged with the threaded portion of the bolts.

The construction just described facilitates the assembly of the wheel and when disassembled the bolts I being secured to the hub and the nuts L being secured to the head M, there is no danger of losing any of the parts. The construction is also one which permits of the successive engagement and disengagement of the nuts and studs, each nut being freely operable independent of all of the other nuts, as well as being independent of the exact position of the member M. To hold the nuts from accidental loosening a lock washer R is sleeved thereon adjacent to a flange Q on one side and bearing against the member M on the opposite side. The lock washers are thus held from disengagement, and when the nut is tightened will serve to hold the same from loosening.

What I claim as my invention is:

1. In a demountable wheel, the combination with a hub provided with an outwardly-extending flange, of a disk-shaped wheel body sleeved upon said hub adjacent to said flange, an annular clamping head for holding said disk to said flange, and clamping means comprising a bolt secured to said flange projecting laterally through an aperture in said annular head, and a nut swiveled and permanently secured to said annular head, the threaded portion of said nut being engageable with the threaded portion of said bolt and capable of screwing on or off the same when said annular head is in clamping position.

2. In a wheel, the combination with a demountable member and a coöperating member on which it is mounted, of a series of threaded studs fixedly attached to the one, a complementary series of nuts secured to the other, and means permitting the nuts to be successively screwed on or off from their corresponding threaded studs.

3. In a wheel, the combination with a demountable member and a coöperating member on which it is mounted, of a series of threaded studs secured to and projecting laterally from one of said members, a complementary registering series of nuts upon the coöperating member, and means for attaching each nut to the member on which it is mounted, permitting of screwing on or off the corresponding threaded stud independent of the other nuts and studs.

4. In a wheel, the combination with a demountable member and a coöperating member on which it is mounted, of a series of threaded studs secured to and projecting laterally from one of said members, a registering series of nuts mounted upon the coöperating member, and means for securing each nut to the member on which it is mounted permitting of a swiveling and longitudinal adjustment of the same sufficient for engagement with and screwing on or off the corresponding threaded stud independent of each of the other nuts and studs.

5. In a wheel, the combination with a demountable member and a coöperating member on which it is mounted, of a series of threaded studs secured to and projecting laterally from one of said members, a complementary series of nuts mounted on the coöperating member, each nut having a swivel and longitudinal adjustment, permitting of its engagement with and screwing on or off its stud independent of the other nuts and studs, and a lock washer mounted in permanent relation to said nut and serving to hold the same from accidental loosening.

In testimony whereof I affix my signature.

ALDEN L. PUTNAM.